Jan. 25, 1966  J. HENRY-BAUDOT  3,231,771
MULTIPLE WINDING ELECTRIC ROTARY MACHINES
Filed July 27, 1961  2 Sheets-Sheet 1

(FRONT FACE)

(REAR FACE)

Inventor:
Jacques Henry-Baudot
By Kenyon Palmer
Stewart & Estabrook
Attorneys

United States Patent Office 3,231,771
Patented Jan. 25, 1966

3,231,771
MULTIPLE WINDING ELECTRIC ROTARY MACHINES
Jacques Henry-Baudot, Antony, Seine, France, assignor to Printed Motors Inc., New York, N.Y.
Filed July 27, 1961, Ser. No. 127,205
Claims priority, application France, Sept. 8, 1960, 838,268
8 Claims. (Cl. 310—207)

The present invention concerns improvements in or relating to multiple winding electric rotary machines wherein the said windings are of the printed-circuit two-face kind, as disclosed in my co-pending applications which matured into Patents Nos. 3,090,880, 3,109,114 and 3,144,574. In such machines, each printed-circuit winding comprises an insulating annular carrier coated with two sets of flat half-turn conductors, which are interconnected by their inner and outer end portions for completing the pattern of the desired type of winding. In such machines further it was proposed to unite two such windings at least in an unitary structure, either for serially connecting said windings or, and preferably, for utilising them as two distinct windings of separate functions: for instance one of said winding is supplied with current and the other delivers an electrical current. Said windings may be both D.C. supplied or A.C. supplied or one of them may be a D.C. winding and the other one an A.C. winding.

Two main arrangements have been made for such multiple winding machines: the first consists of associating by axial coaptation two printed-circuit windings at least, and obviously presents the drawback of greatly broadening the magnetic airgap; the second consists of printing the two windings concentrically one surrounding the other on the same annular carrier and, of course, the overall diameter is increased in such a member.

According to the present invention, on the other hand the two windings, at least, are provided on the same annular insulating carrier without any expansion of the dimensions thereof, and without any thickening of the magnetic airgap in that said windings are arranged on the said carrier by interleaving the groups of conductors per pole thereof. Said windings however may be provided with separate current translating means, also printed on the same carrier but at different locations thereon. The two separate windings are complete in themselves and are insulated from each other.

The invention will be explained in detail with reference to the accompanying drawings, wherein.

Figure 2:
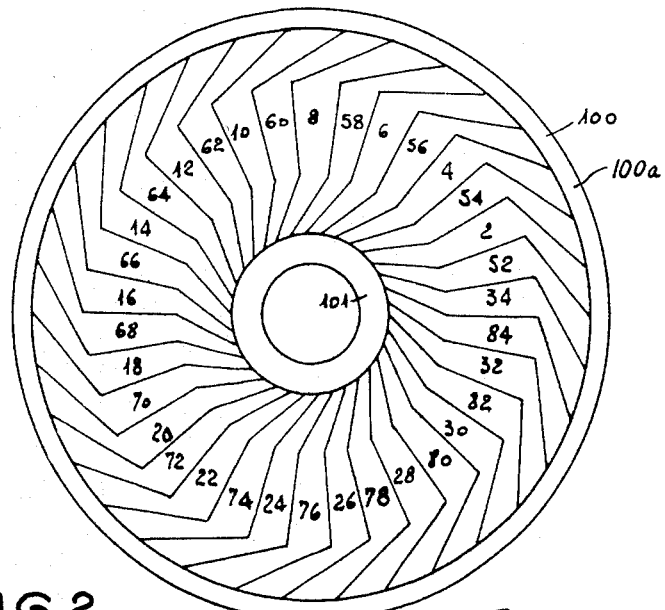

In these illustrative embodiments, the multiple winding comprises two separate windings regularly interleaved on the same insulating carrier ring, shown at 100 in FIG. 2; each winding comprises 17 turns, consequently 17 half-turn conductors per face, and is of the series-wave type. Since there are two windings of 17 turns each, there will be 34 conductors on each face of the carrier 100. Of course, any number of conductors for each winding may be adopted and, when required, the windings may be of the lap-wound type instead of the series-wave one.

Figure 1:
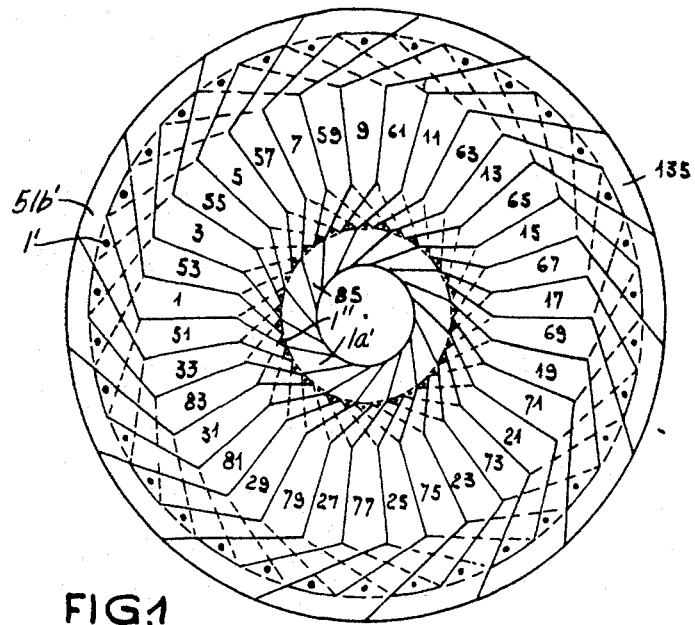
FIGS. 1 and 2 show the two faces of a first illustrative embodiment of the invention for a D.C. machine.

The half-turn conductors of the first winding are numbered from 1 to 33, by odd numbers, on the front face, as shown in FIG. 1 and from 2 to 34 on the other face (see FIG. 2), the conductor 34 being on the rear face behind the conductor 1, the conductor 2 behind the conductor 3 and so forth, in coincidence of the substantially radial median portions of the conductors. Said median portions constitute the active parts of the turns and are extended at both ends up to the edges of the carrier by slanted or curved portions the ends of which register from one face to the other one and must be understood as connected by straight through-connections, for instance comprising metallizations of holes made through the conductive coatings and the insulating carrier. The slanted portions are so arranged as to define the forward and backward pitches of the winding in its electrical pattern. The forward pitch, at the outer portion, is 3, and the backward pitch, at the inner portion, is 5, so that the winding passes from conductor 1, front face, to the conductor 4, rear face, comes back to conductor 9, front face, and so forth, the said winding closing upon itself after four turns on the annular area it covers.

The second winding is similar to the first and, on the drawings, its front face conductors are numbered from 51 to 83, by odd numbers, on the front face, FIG. 1, and from 52 to 84, by even numbers, on the rear face.

As shown in FIG. 2, the conductors on the rear face do not extend entirely to the outer and inner circular edges of the ring carrier 100, but they terminate short of these edges to provide a clear annular area 100a at the outer edge and another clear annular area 101 at the inner edge.

As shown in FIG. 1, the odd numbered conductors 1 to 33 terminate at their outer ends at the same radial distance from the center of the ring carrier 100 as the conductors on the back face (FIG. 2), and the odd numbered conductors 51 to 83 on the front face terminate at their inner ends at the same radial distance from the center of the carrier as the even numbered conductors on the rear face, see FIGURE 2. The through connections between the conductors on one face and the conductors on the other face, as mentioned above, are completed at locations where the slanted end portions of the conductors on the rear face overlap the slanted end portions of the conductors on the front face.

The windings are made for a eight pole machine as apparent from their pattern.

In the kind of machines concerned, the brushes must bear directly on the conductors, preferably on slanted portions thereof. For securing such an advantage in the multiple windings according to the invention, special provisions are made.

When the brushes are to be applied on the same face of the multiple winding member, FIGS. 1 and 2, the slanted parts of the conductors of one winding are extended at their inner ends to form an inner ring 85 of the slanted terminal portions and the slanted portions of the conductors of the other winding are extended at their outer ends to form an outer ring 135 of slanted terminal portions, so as to obtain commutator segment rings, of contiguous segments, upon which will bear the respective brushes, not shown, for the one and the other of the interleaved windings, respectively.

The construction just described is illustrated in FIGURE 1 where 85 indicates the ring of commutator segments at the inner ends of odd numbered conductors 1 to 33 respectively, and the ring of outer commutator segments 135 is formed of extensions of the slanted portions of the odd numbered conductors 51 to 83 respectively. It will be noted that each ring of commutator segments includes only 17 segments, and each segment is enlarged peripherally to be contiguous with the next segment and to extend across the end of the adjacent conductor. For example, the inner commutator segment 1a' for conductor 1 is of greater angular width than the conductor 1 and extends across the inner end of conductor 53. Likewise, the outer commutator segment 51b' for the outer end of adjacent conductor 51 is formed opposite the clear area 100a in FIGURE 2 and is of an angular extent sufficient to cover the outer end of conductor 1. Thus it will be seen that the structure represented in FIGURES 1 and 2 involves an inner ring of contiguous commutator segments 85 and an outer ring of contiguous commutator segments 135 with half-turn conductors extending generally radially between these two commutator rings. The inner ends of alternate conductors are connected to the segments of ring 85, and the outer ends of the remaining conductors are connected to segments in the ring 135.

Figure 3:
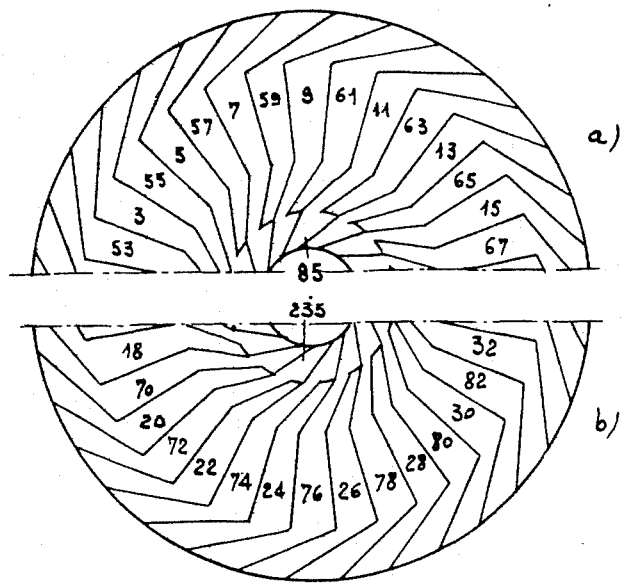
FIG. 3 shows in two half-views, front face and rear face respectively, an alternative embodiment to that shown in FIGS. 1 and 2.

When it is possible to apply the brushes on both sides of the winding member, FIG. 3, the conductors of one of the windings are extended at their inner ends to form the ring of commutator segments 85 on the front face, see FIG. 3a, and the conductors of the other winding are extended at their inner ends to form the ring of commutator segments 235 on the rear face, said segment rings registering from face to face, for instance at the inner edge of the carrier member. (However, the two rings may be made at the outer edge of the member, if desired.)

Such arrangements retain the feature that the commutator comprises as many blades as are turns in the winding.

It would have been possible to superficially insulate the winding conductors, except for fractions of said conductors in two rings of distinct diameters, one for each winding, or in two rings of the same diameter but on the opposite faces of the member. However, on the one hand, the commutator would not be formed with contiguous segments, and on the other hand, the superficial insulating film between the segments would be liable to rub off under the friction of the brushes.

In another method, distinct rings of segments may be provided and insulately applied over the windings, with through connections between said segments and the conductors through the insulation. This would necessitate an additional manufacturing operation, which is not desirable.

Consequently, though the one and the other of the two mentioned arrangements may be used in machines according to the present invention, it seems preferable to use the former one, i.e. the arrangement wherein the commutator segments are printed along distinct rings together with the winding conductors proper.

Figure 4:
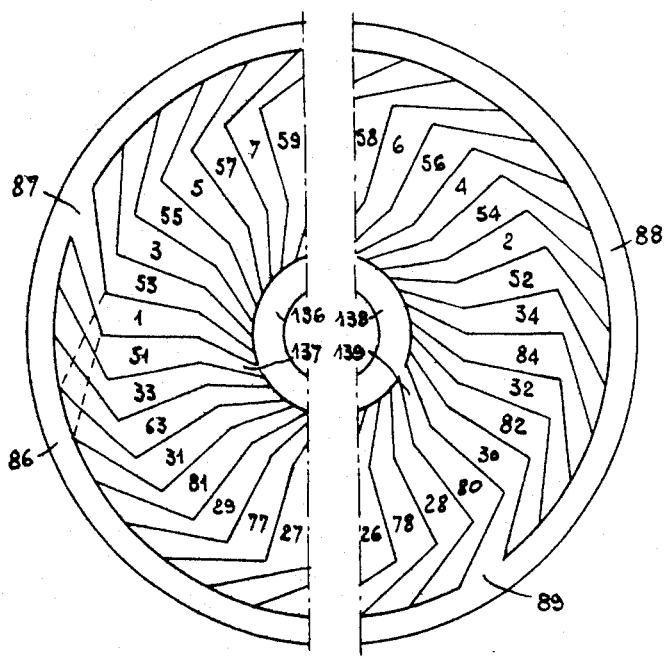
FIG. 4 shows in two half-views, front face and rear face, an example of embodiment for an A.C. machine.

For the windings to use in A.C. machines, it suffices to provide, FIG. 4, concentric rings of conductive coating directly connected to conductors spaced apart by 180 electrical degrees. For instance, in FIG. 4, on one face are provided the concentric rings 86 and 136, and on the other face are provided the concentric rings 88 and 138. Conductors 1 and 30 of the first winding are connected by direct coatings 87 and 89 to the rings 86 and 88, and the second winding has its conductors 51 and 80 connected by coatings 137 and 139 to the rings 136 and 138. Of course, such conductive rings may be separately formed and applied over the member through insulating ring layers, if required, the connections to the winding conductors being provided through said insulating ring layers. Such an arrangement will be mainly useful for tri- or multiphase windings, when required, and the arrangement will then be similar to the one disclosed in copending application No. 22,508/60 for single winding printed-circuit members.

From the foregoing it will be understood that the commutator segment rings 85 and 135 shown in FIGURE 1, and the commutator segment rings 85 and 235 shown in FIGURES 3a and 3b, as well as the rings 86–136 and 88–138 of FIGURE 4, all constitute tracks for appropriate brushes which bear upon these rings during operation of the machine.

The combination in a single member of an A.C. and a D.C. windings is obvious from the above description of examples embodying both D.C. and both A.C. windings. One of said winding will be provided with a segment commutator ring and the other one with a pair of conductive continuous rings.

What is claimed is:

1. A multiple winding unit for a rotary electric machine comprising, a flat disc-shaped carrier having annular insulating surfaces on opposite faces thereof, a first annular winding mounted on said carrier and formed of first and second sets of flat conductors adhering to said annular surfaces on opposite sides of said carrier, respectively, and extending generally radially across said annular surfaces, the conductors of said first and second set being connected in series circuit relation in a closed winding circuit by through-connections extending from one face to the other face of said carrier, alternate conductors in said winding circuit being located on opposite faces of said carrier, and a second annular winding constructed of third and fourth sets of flat conductors adhering to the annular surfaces on opposite sides of said carrier, the conductors of said third and fourth sets being interposed between the conductors of said first and second sets, respectively.

2. A winding unit according to claim 1 wherein the circuit of each annular winding extends around the carrier a plurality of times before closing upon itself.

3. A winding unit according to claim 1 and including a first circular brush-track of conducting material applied to an annular insulating area of said carrier and connected to one of said annular windings, and a second circular brush-track of conductive material applied to an annular insulating area of said carrier and being connected to the second annular winding.

4. A winding unit according to claim 3 wherein said brush-tracks are located on the same face of said carrier at the inner and outer peripheries thereof.

5. A winding unit according to claim 3 wherein said brush-tracks are located on opposite faces of said carrier at one of the peripheries thereof.

6. A winding unit according to claim 3 wherein said first and second circular brush-tracks are located on the one face of said carrier and comprise continuous rings of conducting material located at the inner and outer peripheries of the insulated annular surface of said one face.

7. A winding unit according to claim 4 wherein said brush-tracks are formed as rings of commutator segments, one segment being provided for each turn in each of said windings.

8. A winding unit according to claim 6 and including a pair of continuous rings of brush-tracks located on the opposite face of said carrier at the inner and outer peripheries thereof, the outer ring on one face being connected to one annular winding at a first point, and the inner ring on the opposite face being connected to the same annular winding at a second point 180° from said first point.

References Cited by the Examiner
UNITED STATES PATENTS

| | | | |
|---|---|---|---|
| 2,550,571 | 4/1951 | Litman | 310—268 |
| 2,970,238 | 1/1961 | Swiggett | 310—268 |
| 3,054,011 | 9/1962 | Silvershotz | 310—268 |

ORIS L. RADER, *Primary Examiner.*

MILTON O. HIRSHFIELD, DAVID X. SLINEY, *Examiners.*